United States Patent [19]

Strohm

[11] Patent Number: 5,305,864
[45] Date of Patent: Apr. 26, 1994

[54] MOTOR VEHICLE CLUTCH DISC

[75] Inventor: Fritz Strohm, Kürten-Eichhof, Fed. Rep. of Germany

[73] Assignee: Textar Kupplungs- und Industriebeläge GmbH, Leverkusen, Fed. Rep. of Germany

[21] Appl. No.: 4,089

[22] Filed: Jan. 13, 1993

[30] Foreign Application Priority Data

Jan. 17, 1992 [EP] European Pat. Off. ...... 921007290.0

[51] Int. Cl.$^5$ ............................................ F16D 13/60
[52] U.S. Cl. ..................... 192/107 C; 192/107 M; 192/107 R
[58] Field of Search ............ 192/107 C, 107 R, 107 M

[56] References Cited

U.S. PATENT DOCUMENTS

| | | | |
|---|---|---|---|
| 1,898,978 | 2/1933 | Lane | 192/107 R |
| 2,097,710 | 11/1937 | Whitelaw et al. | 192/107 R |
| 3,486,218 | 12/1969 | Buyze | 192/107 R |
| 3,623,577 | 11/1971 | Scharlack | 192/107 R X |
| 3,623,579 | 11/1971 | Hendrickson et al. | 188/218 X |
| 3,964,586 | 6/1976 | Barrett et al. | 192/107 C |
| 4,345,676 | 8/1982 | Jarvis | 192/107 C |
| 4,727,972 | 3/1988 | Mueller | 192/107 C |
| 4,967,892 | 11/1990 | Tojima et al. | 192/107 C |
| 4,993,531 | 2/1991 | Villata | 192/107 C |
| 5,076,409 | 12/1991 | Graton et al. | 192/107 C |
| 5,085,307 | 2/1992 | Scheer | 192/107 C |
| 5,137,133 | 8/1992 | Graton et al. | 192/107 C |

FOREIGN PATENT DOCUMENTS

| | | |
|---|---|---|
| 0351447 | 1/1990 | European Pat. Off. . |
| 0419329A1 | 3/1991 | European Pat. Off. . |
| 0446098A1 | 9/1991 | European Pat. Off. . |
| 2453318 | 10/1980 | France . |
| 2191831A | 12/1987 | United Kingdom . |

Primary Examiner—Leslie A. Braun
Assistant Examiner—Andrea Pitts
Attorney, Agent, or Firm—Spencer, Frank & Schneider

[57] ABSTRACT

A motor vehicle clutch disc includes a metal carrier sheet; an elastomer intermediate layer facing the metal carrier layer; a clutch lining facing the elastomer intermediate layer; and a composite binder bonding first surface regions of the elastomer intermediate layer to the metal carrier sheet and to the clutch lining by chemical sorption. Areas of the first surface regions are less than areas of the metal carrier sheet and the clutch lining facing the elastomer intermediate layer. The elastomer intermediate layer is of hydrated nitrile rubber or a fluoroelastomer. The elastomer intermediate layer has an elasticity of non-linear spring characteristics and is effective in a direction perpendicular to the plane of the clutch disc. The elastomer intermediate layer has unbonded, second surface regions facing the metal carrier sheet and the clutch lining. The elastomer intermediate layer is of such a configuration that in an absence of a compressive force applied to the clutch disc in a direction perpendicular to the clutch disc plane, the second surface regions are in their entirety spaced from the metal carrier sheet and upon applying such a compressive force to the clutch disc, at least parts of the second surface regions assume a contacting relationship with the metal carrier sheet and/or the clutch lining.

10 Claims, 7 Drawing Sheets

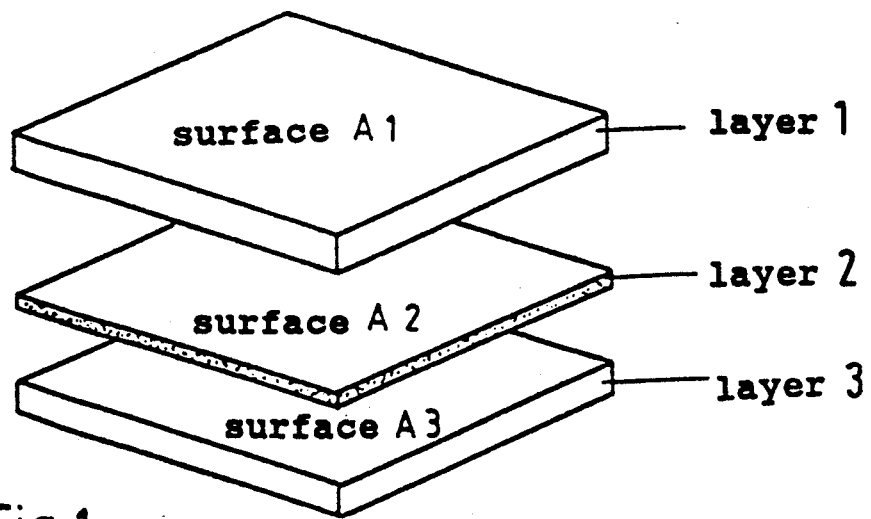
Fig. 1
(PRIOR ART)
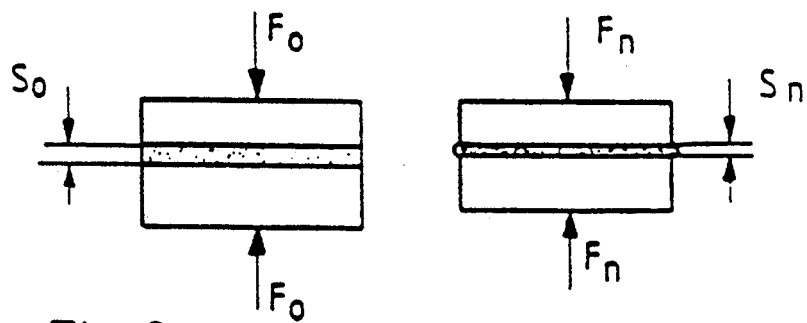
Fig. 2
(PRIOR ART)
Fig. 3
(PRIOR ART)
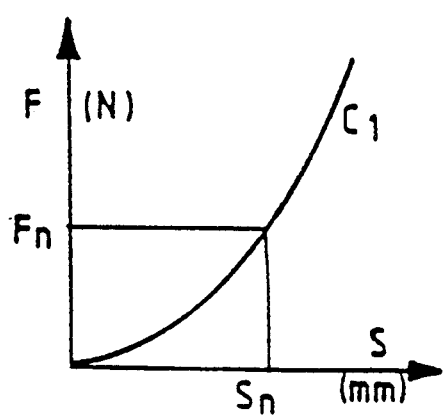
Fig. 4 (PRIOR ART)

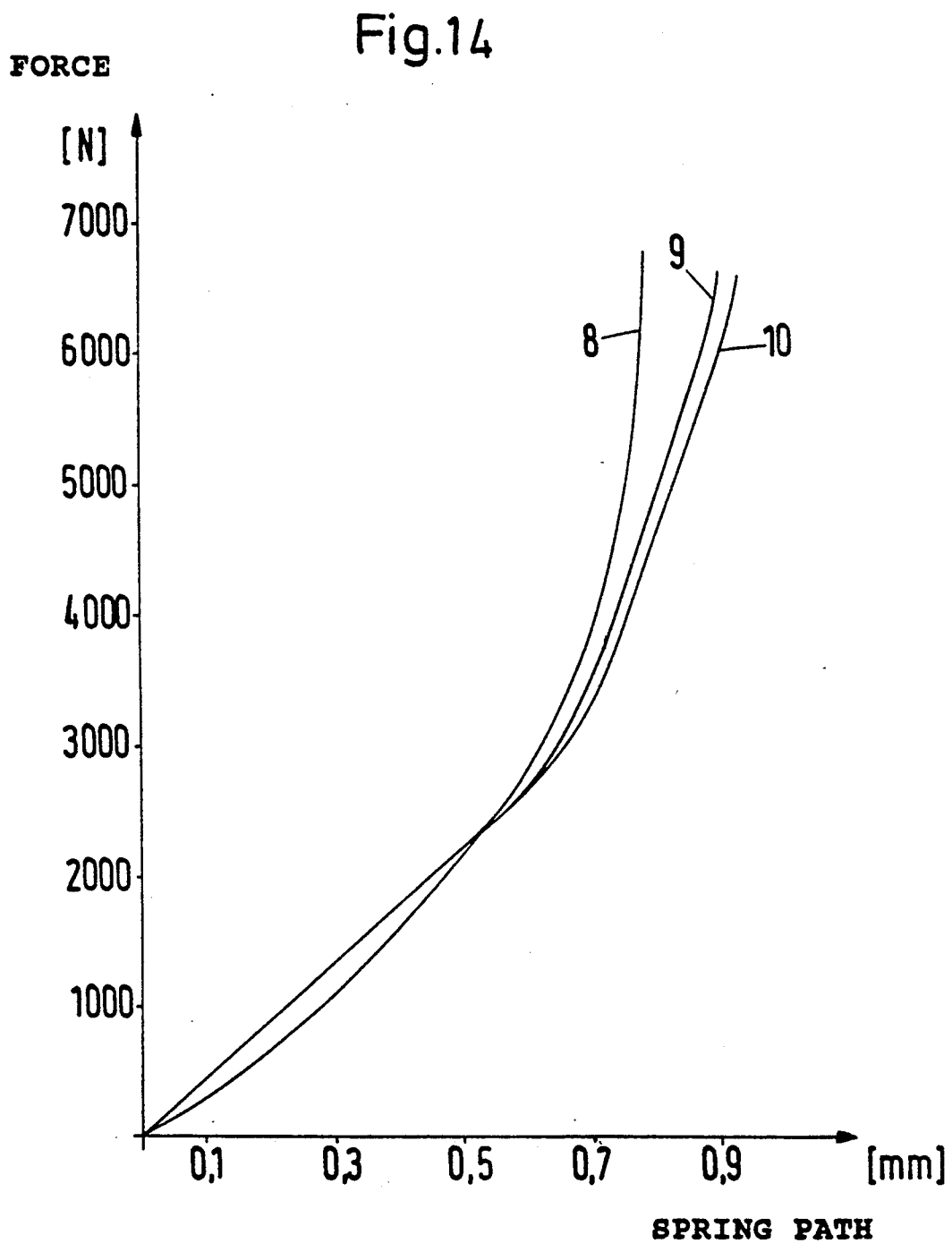

MOTOR VEHICLE CLUTCH DISC

CROSS REFERENCE TO RELATED APPLICATION

This application claims the priority of Application Ser. No. EP 92/00729.0, filed Jan. 17, 1992, in the Federal Republic of Germany.

BACKGROUND OF THE INVENTION

The invention relates to a clutch disc for a motor vehicle clutch including a carrier plate connected with an elastomer intermediate layer that is connected with a clutch lining, with the elastomer intermediate layer being essentially composed, as taught by EP 0,351,447, of hydrated nitrile rubber (HNBR) and/or a fluoroelastomer (FPM). By way of a composite binder, the elastomer intermediate layer is connected with the adjacent layers by chemical sorption. The elastomer layer acts as a spring and imparts to the clutch disc an elasticity with a non-linear spring characteristic in a direction perpendicular to the plane of the clutch disc. The connecting faces between the elastomer intermediate layer and the adjacent layers are smaller than the faces of the adjacent layers facing the intermediate layer (partial congruence).

The basic characteristics of such a clutch disc are disclosed in EP 0,351,447. Compared with prior art clutch discs, this disc is particularly distinguished in that an elastomer intermediate layer is provided instead of the steel springs that are otherwise riveted to the friction linings, thus enabling the clutch linings to be made a few millimeters thinner since, due to the absence of rivets, they can be worn down completely. Nevertheless, this clutch disc is able to withstand all demands made on it during operation, particularly with respect to stressability also under heat, wetness, etc., because, according to the cited patent, the elastomer intermediate layer is connected with the adjacent layers by means of chemical sorption.

In this European patent it is also proposed to impart a defined non-linear spring characteristic to the elastomer intermediate layer in that the faces are only partially congruent. That means, the elastomer intermediate layer is made smaller than the two layers adjacent to it and connected with it.

An English-language translation of the entire specification of EP 0,351,447 is reproduced at the end of this "Background" section.

In connection with the prior art, reference is also made to U.S. Pat. No. 1,898,978 which already discloses a clutch disc whose friction coating is provided with notches that extend ray-like essentially in the radial direction of the lining. However, the clutch lining is here contiguous and the notches are provided to reduce the noise developed during engagement of the clutch. They are not intended to impart a defined non-linear spring characteristic to the clutch disc; and they are unable to do this since they are attached in an essentially non-elastic material, namely in the actual clutch lining.

Similar prior art is disclosed in U.S. Pat. No. 2,097,710 where the carrier sheets of the clutch discs disclosed there are corrugated in some embodiments and the clutch lining is provided with radially extending grooves. Here again, it is not possible nor intended to impart a predetermined spring characteristic to a clutch disc.

TRANSLATION OF COLUMNS 1 THROUGH 11 OF THE DESCRIPTION IN EUROPEAN PATENT APPLICATION 0,351,447

The invention is relating to a multiple layer structural element for the transmission of a frictional force, particularly for clutches or brakes with a supporting layer, an intermediate layer of elastomer material and a frictional layer of a friction material, possibly with an intermediate layer of at least one further supporting layer, and at least one further intermediate layer between the supporting layer and the friction layer.

Conventional clutches are consisting of an iron supporting plate which is connected by rivets with the clutch facing. Moreover, in the supporting plate often bends are provided, lending to the clutch an elasticity in axial direction. In this, it is especially disadvantageous that the clutch facing only can be worn off up to the depth of the rivets because over the rivets no satisfactory friction connection is no longer guaranteed. The material of the clutch facing between the upper side of the rivets and the supporting plate cannot be utilized for the actual friction work.

For this, already a multiple layer structural element has given relief which has been described in GB-A-21 91 830. Here the rivets connection is substituted by an adhesive connection, and from this prior art the invention is starting. As an advantage it is to be pointed out that here, at least theoretically, the complete thickness of the clutch facing can be utilized before the clutch facing must be renewed. Therefore, respective thinner clutch facings are sufficient which not only saves costs but is considerably reducing the inertia of the clutch. It is also to be considered that the clutch facing is placed in the area of the outer radius of the clutch which area as known is entering squarely into the moment of inertia.

In the mentioned GB-A-2 191 830 the supporting disk and the actual clutch facing are glued together by a swiftly hardening silicone caoutchouc which is applied spirally on the supporting disk. The silicone caoutchouc is hardening within approximately ten seconds, and during this time the connection must be established. The silicone caoutchouc is pressed out of a cartridge, and with each new adhesive connection the initial part of the silicone caoutchouc does not contribute to the adhesion. Cutting off of this initial part of the piece of silicone caoutchouc often is not possible because of the very short time at disposal. It is still more disadvantageous that as tests have shown, the adhesive connection will not withstand the loads during operation of such a clutch.

The invention is avoiding these disadvantages. It is its object to provide a multiple layer structural element for the transmission of a friction force, particularly for clutches and brakes which is withstanding all requirements and loads during operation. The structural element according to the invention shall particularly provide a defined spring characteristic in axial and/or tangential direction.

For solving this object the invention is characterized in that the intermediate layer is consisting substantially of hydrogenated nitrile caoutchouc and/or a fluoroelastomer being connected by a composite binder by means of chemical sorption with the adjoining layers.

Tests have shown that hydrogenated nitrile caoutchouc and also fluoroelastomer conform to all requirements and loads which are required in operation by such a clutch or brake. The intermediate layer according to the invention, consisting of these materials therefore are fulfilling the task to give to the respective structural element a defined spring behavior (in axial and/or tangentral direction). This is made firstly by a suitable design and/or composition of the intermediate layer. Moreover, the intermediate layer is taking care of a high loading capacity connection to the adjoining materials for which the mentioned binder is provided which by means of chemical sorption is connecting the respective layers durably and with high loading capacity.

In the structural element according to the invention therefore the mechanical connecting means, for instance rivets as in the prior art, can be relinquished. Therefore, the complete thickness of the friction layer can be utilized for the transmission of the friction force and respective thinner friction layers can be used, respectively, again related with the advantage of a considerably reduced moment of inertia.

As already mentioned the connection between the intermediate layer and the adjoining layers is effected by chemical sorption. As known, this chemical sorption is present when a gaseous, liquid or solved substance is deposited and received, respectively, at the surface of a solid body or by a liquid by forming of a chemical compound. Same is therefore substantially differing from a glued connection as in the prior art which has the disadvantage that the adhesive is hardening. In the then occurring loads, particularly bending loads, there is the danger with the prior art that the adhesive connection is tearing. All these disadvantages are not present in the structural element according to the invention.

For supporting the chemical sorption the surfaces of the supporting layer and the friction layer to be connected with the intermediate layer can be activated mechanically and/or chemically prior to the connection. For the activation of a supporting layer consisting of metal, this will be particularly activated by a finely crystalline layer of zinc phosphate and subsequent passivation (secondary compression), for instance by chromic acid solutions.

For the binder a basis of modified phenol resins and-/or modified cresol resins is preferred to which synthetic caoutchouc and active fillers are added in a finely distributed solvent dispersion. One will not use moisture reactive binders in order to make the connection moisture resistant and safe for processing. As active fillers vulcanization aids or the like can be used. The dispersed solid materials shall be very finely distributed in the solvent so that the respective surface (of the supporting layer and the friction layer, respectively) is also activated up to and into the microscopic depressions.

The intermediate layer and/or the supporting layer can be provided equiareal with the friction layer. A further degree of freedom is that the intermediate layer and/or the supporting layer only in partial areas is congruent with the friction layer. The reason for this additional degree of freedom is that the connection between the layers according to the invention is so good that for the reasons of the connection no full-area intermediate layer is required; same can be rather punched out or have a reduced thickness in predetermined regions for obtaining defined spring characteristics. In the extreme case the intermediate layer for instance can be provided by a nub path in that only the tips of the nubs are connected to the adjoining layers. However, any configurations of the intermediate layer are possible, possibly also of the supporting layer, while the friction layer usually is provided over the full area for obtaining the greatest possible great friction force.

The reason for the advantages of the structural element according to the invention also is that the frictional layer can be provided relatively thin and by this is very well adapting itself in its contour to the surface of the counter layer of the from the outside adjoining friction layer so that practically from the start the complete surface of the friction layer is contributing equally to the production of the frictional force. Thermal local peak loads as in the prior art therefore, are no longer occurring, at least if the friction layer is made sufficiently thin and flexible.

In the following the invention is further described in an embodiment from which further important features are resulting. It is shown in:

FIG. 1—perspectively in extended illustration the basic structure of a structural element according to the invention which in this case is consisting of three layers, and with equiareal layers;

FIG. 2—a side view of such a structural element in unloaded condition (force vectors $F_0$ and thickness of the flexible intermediate layer $S_0$);

FIG. 3—the situation of FIG. 2 in loaded condition (force vectors $F_n$ and thickness $S_n$);

FIG. 4—as a diagram the spring characteristics of this structural element, wherein the in N measured force F is plotted over the in millimeters measured deflection;

FIG. 5—an illustration according to FIG. 1 with a frame-like intermediate layer which is thus not equiareal;

FIG. 6—a view of the structural element according to FIG. 5, according to FIG. 2;

FIG. 7—a view of this structural element according to FIG. 3;

FIG. 8—the spring characteristic of this structural element;

FIG. 9—as an example a composite spring characteristic of a structural element according to the invention.

At first, the structure and the character of a structural element and its components, respectively, are described.

The material combination according to the invention is mainly comprised by at least three different materials which are durably connected with each other.

The three main layers are defined as follows:

Layer No. 1 (Friction Layer):
Friction Material
a) structured of so-called fiber moldable material, i.e. consisting of organic binders, short fiber and/or grinding flakes and filling components; and/or b) structured of a polymer friction cement and reinforcing thread(s) and/or twine(s) which had previously been impregnated and/or coated with the polymer friction cement. The winding structure can be spirally or be made according to the scatter-wound/random-wound process; and/or c) structured of textile strips and/or tapes impregnated and/or coated with friction cement; and/or d) structured of layers of a non-woven fabric impregnated with friction cement and/or superposed.

Layer No. 2 (Intermediate Layer):
Structured of a highly reactive and especially filled elastomer adhesive compound which is vulcanized by the effect of pressure, temperature and time and subsequently is ensuring certain defined functional properties in the mechanical/dynamical range in itself as well as related to the connection with both other layers No. 1 and No. 3.

Layer No. 3 (Supporting Layer):

Metallic or non-metallic supporting material in form of a geometrical mechanical formed disk, plate, segment, strip of random geometrical thickness, length, width or diameter extension.

Description of the Connection Between Layers 1, 2 and 3

The layers 1, 2 and 3 after respective primary treatment are undetachably and durably connected with each other into an assembly by chemical sorption. The minimum 3- or n-layer assembly (n >2) developed in this way is then guaranteeing exactly defined values of functional properties in respect to the layer as well as overlapping in the layer composition.

By this it is to be understood that under operation conditions tribological, dynamic and strength property values of the layer composition are mutually supplementing, supporting, (strengthening) compensating and/or neutralizing themselves. The elasticity property of layer No. 2 perpendicularly or transversely to the direction of load has an especially functional value (axially, radially and/or tangentially defined spring and/or damping attitude).

The irregular (stochastic) friction vibrations occurring in the friction function between layer No. 1 and the counterrotation material can be positively influenced by the consistency and the geometrical form of the elastomer layer No. 2 enabling to transfer certain vibrational spectrums into other frequency ranges or to even totally eliminate same by self-damping.

Moreover, by the consistency and geometrical design of the elastomer layer No. 2 the characteristics of the force initiation can be exactly predetermined, thereby substituting the functional characteristics of presently usual metallic spring elements in the form of, e.g., segment springs equally or with higher value.

As a consequence of this property of the elastomer layer No. 2 and in connection with a thereto adapted thickness of the friction layer No. 1 the layer compound is enabled to join closely over Nos. 1 and 2 the counterrotation material (gray cast iron GG, steel St, etc.).

Thereby it is guaranteed that the surfaces of the friction material already after a short initial run-in (embedding time) are developing themselves to optimum contact patterns. Transformations of friction surfaces and varying friction forces, friction radii and/or friction moments as presently existing in usual force-locked, form-locked and adhesive connections between friction material and supporting material are strongly reduced or completely eliminated. Since each surface element is almost evenly participating in the transformation of energy during the dynamical friction process by means of friction operation, slipping operation, form changing operation and thermal convection as well as reflection, with the construction of the layer compound in total a higher dynamical friction capacity can be transmitted.

In maintaining the presently usual energetically required profile derived from the conventional construction over elastic friction receptacles and a force-/form-/adhesive the following is obtained:

a) By this high, i.e. full-area, contact pattern of the friction layer No. 1 with counterrotation material (GG, St, etc.) a clearly lower abrasion behavior and thereby an increase of durability and service life, respectively.

b) The possibility that only changing partial friction areas are participating in the transmission of friction energy (formation of friction spots), thereby initiating as a consequence temperature concentrations on the surfaces of the counterrotation material (hot spots), is very small. Also very small is the chance that by the formation of temperature spots on the surface of the friction material of layer No. 1 sintering processes and/or formations of glass spots are developing.

c) The even utilization of the present geometrically/constructionally determined nominal surfaces of friction function (square; rectangle; circle; circular ring; segment etc.) in the dynamical transmission of friction energy allow to correspondingly reduce the presently necessary surfaces when utilizing the invention.

d) From this firstly the perspective is derived that by application of this constructional system the structural measurements of present friction locking brake and clutch aggregates can be decreased and secondly, that an increased comfortable attitude in the phase of determination of friction is present.

Description of the Production of Layer No. 2 and the Required Preparation Techniques in Relation to Layers No. 1 and 3

The principle to connect with each other in the range of a rubber-metal-friction-layer-connection completely different substrates which can hardly be glued or not be glued at all with normal adhesives, can now be transferred also to friction layers according to this invention if with the applied organic binders a certain affinity is present. In this, the connection must conform to the demand to be highly thermally loadable and corrosion resistant and guarantee stability against usual lubricants, oils and other cleaning means.

For this purpose in the phase of basic tests the most different commercial elastomers on the basis of NR; SBR; FPM; EPDM; CR; NBR and silicone were tested. At the end of this series of tests a fully hydrogenated nitrile caoutchouc (HNBR) was chosen for this high-grade elastomer intermediate layer No. 2.

This decision was also supported by the double bindings in the polymer chain of the NBR being very reactionable and thereby guarantee that chemical substances being able to be added can be deposited. By this, very stable connections between the elastomer (HNBR) and a suitable binder system are ensured. Furthermore, it could be established in preliminary tests that a "gluing" of friction layer/elastomer/metal, wherein in this case the elastomer is to be understood as a vulcanizate, is not guaranteeing stable and durable connections against perspiration and "boiling" water, respectively (according to DIN 50017). The "gluing" was embrittled after a short time and structurally destroyed. In a further testing phase a "composite rubber-metal binder was employed which already guaranteed a substantially higher mechanical strength and thermal stability ($\geq 250°$ C.) of the connection. The reason for the higher quality of this connection is to be explained as follows:

On "activated" metal surfaces (chemical and/or mechanical) and at the border surfaces binder/elastomer as also binder/ metal and binder/friction layer chemical alternating effects are occurring which are taking place approximately in the same orders of magnitude. One can assume that by "electron exchange" at these border surfaces of the connection between layers 1, 2 and 3 electrically charged double layers are formed which mutually attract themselves like condenser plates over the same size charge carriers so that by these alternating effects at the mentioned border surfaces by chemical sorption a maximum degree of mechanical strength is established. Practical tests made use of the possibility to apply a "non-vulcanized" HNBR-caoutchouc mixture with the substrates to be bound (friction layer No. 1 or supporting layer No. 3). This mixture can be chosen to be sprayable (TM and/or IM Process) as well as produced by calendaring into skins or foils. In this, only under pressure and temperature after a predetermined reaction period the intermediate layer No. 2 with the friction coating back (layer No. 1) and with the supporting material (layer No. 3) is vulcanizing to an insoluble connection in an especially therefor produced tool.

The advantageous energetic process parameters for the vulcanizate as well as for the connection are resulting from a so-called "step-up cure". Experiences which could be made during these optimizing tests with hydrogenated nitrile caoutchouc have shown that normally a high rate of vulcanization—extensively independent from temperature and time—is the functional premise for a good connection, and that the developed elastomer can be well bound when the vulcanizing characteristic is characterized by a sufficient "flow period", a high vulcanizing speed" and a distinct "plateau (respective indicator=rheometer curve). By respective progress characteristics in interaction between vulcanizing curve and Monsanto rheometer function the utilized binder system was optimized.

The still thermoplastic caoutchouc mass (elastomer intermediate layer No. 2=HNBR) is softening under pressure and temperature and during the "flow period" is effecting a close contact between the binder film binder/support on the one hand and binder/friction coating on the other hand. After the beginning of vulcanization, the so-called incubation period the insoluble and durable connection is effected. This effect can be exactly proved by the ascending part of the curve function in the rheometer. After cooling of the assembly consisting of layers 1, 2 and 3 from a temperature level between 130°-165° to room temperature the final strength of the functional part is reached. Further energetic or mechanical working processes are not required.

From this basic description it is also derived that the connection is independent from the loaded surface portions in the contact planes of the layers 1-2 and 2-3. It is therefore possible to pointedly determine surface geometries for the elastomer intermediate layer No. 2 deviating from the surface congruency (FIG. 1). Thus from the skin and/or the foil definedly determined geometrical plane configurations can be taken, and can be joined in the sense of the layer compound. These skin/foil-"blanks" in their thickness as well as in their dimensions can be punched out coherently or freely mechanically to among others lattices, screens, meanders and chains. The joint facing or the portion of the plane compound between layer 2 and 1 on the one side as well as layer 2 and 3 on the other side and the thickness of the foil or the skin (Sx) to be chosen is providing at axial load via transverse contraction forces an additional degree of freedom in relation to the spring elasticity (FIG. 2). The other degree of freedom is reached by the consistency of the elastomer layer by chemical material components as well as the degree of vulcanization. These relations are graphically illustrated (superposition) in FIG. 3.

Application

The existing material compound consisting of layers 1, 2 and 3 necessarily always requires in relation to layer No. 1 an organic and/or an inorganic friction material.

In this respect in all possible application cases in which this invention is applied, it is a matter of frictional transmission connections and thus generally application cases of tribological application forms.

This category includes all tribological functions which can be classified by the collective denomination of adhesive, creeping and gliding friction (static and dynamic friction processes).

Classical main applications lie in the domain of the driving technology (for instance friction or sliding clutches) as well as in the domain of braking technology (for instance disk, drum or band brakes).

The friction energy or work in consideration of inverse sign is basically equal between both main application ranges >driving technology=clutches and braking technology=friction brakes in respect to scalar (value amount), and is given in (J) or in (NM$^2$). If the friction capacity resulting from the friction energy or work is related to a surface unit, the specific friction capacity is defined. Same is indicated as (W/cm$^2$).

By the optimized uniform contact pattern of the friction surfaces described in the invention it is possible to safely transmit higher friction energies during the energy transformation (dynamically cycled processes).

In case of a static (not moving) application configuration higher and more inform force and friction moment transmissions become possible (for instance safety sliding clutch).

Consequently, it can be concluded in comparison to the presently usual constructive arrangements that in maintaining these characteristic energy values an adequate decrease of the effective friction surfaces can take place. This means lastly that a decrease of the structural measurements of the aggregates is allowable (brakes and clutches).

As the introduction of force can be functionally and definedly regulated over the compound of layers No. 1 and 2 (thickness of the friction layer, consistency of the elastomer intermediate layer, geometrical design of the elastomer intermediate layer), a comfortable, friction determined engagement is present. Instabilities of the friction value within the slipping phase of $$V_{rr} \rightarrow V_{ref} = 0 \quad (V = speed)$$

(synchronous running) are substantially absorbed tangentially (transverse force) by the behavior of the torsional spring of layer No. 2. Stick-slip phenomena described as so-called scraping (brake), plucking (clutch) and noise developments (generally) may be noticeably reduced or eliminated by the invention.

The structural element according to the invention is particularly distinguished by the following features:

1. A minimum of three and a maximum of about ten layers wherein always one layer (the friction layer) imperatively has to consist of an organic/inorganic material.

2. As a supporting material (layer No. 3) any material, metallic or non-metallic can be employed.

3. The intermediate layer No. 2 is consisting of a suitable mixture recipe.

4. The compound is ensured by chemical sorption and composite binders.

5. The preparatory treatment (activation) of the surface is effected mechanically and/or chemically.

6. The intermediate layer No. 2 is durable, by which is to be understood that constant temperatures of $\leq 180°$ C. according to DIN 53508 and ASTM D 429 can react upon the layer.

7. Layer No. 2 and also its connection to layers Nos. 1 and 3 is durable against oils, lubricants, cleaning means, fuel, etc., according to DIN 53521.

8. Between layers Nos. 1, 2 and 3 a full-area congruence or also a partial area congruence may exist, that is, the supporting surface may be No. $3 \neq 1$ and No. $2 \neq 1$ and 3.

9. The intermediate layer No. 2 is substantially formed of HNBR and/or FPM.

10. The layer compound has a defined rubber spring characteristic (axially and/or tangentially).

FIGS. 1–4 are showing as an example equiareal layers and in the diagram the force effected from the outside, plotted over the spring path (spring characteristic $C_1$). For the surfaces A the following is true: $A_1 = A_2 = A_3$.

FIGS. 5–8 are showing a non-equiareal intermediate layer which in this example is frame-like also with associated spring characteristic $C_1$. For the surfaces the following is true: $A_1 \neq A_2 \neq A_3$.

FIG. 9 is showing as an example a composite spring characteristic $C''_1$ from which the influence of the material arrangement and the design of the intermediate layer 2 is becoming clear.

SUMMARY OF THE INVENTION

It is an object of the invention to provide a clutch disc which, while having the features and maintaining the advantages of the prior art clutch disc according to the cited European Patent, is distinguished by a positive and defined, non-linear spring characteristic, with the clutch disc being able to withstand all demands placed on it during operation and being of simple construction.

For a solution of this problem, the invention is characterized in that the elastomer intermediate layer has such a profile that, if a compressive force acts on the clutch disc in a direction perpendicular to its plane, additional surface regions of the intermediate layer come in contact with at least one of the respectively oppositely disposed faces of the two adjacent layers.

With these measures, the generation of a compressive force, after a predetermined spring path, causes the mentioned additional surface regions to continuously increase the counter-force exerted, in addition to the regions of the elastomer intermediate layer that are connected with the adjacent layers by way of chemisorption. These additional surface regions are then also compressed. Thus, if the clutch disc is not charged, these additional surface regions do not lie directly against the adjacent layers but form gaps and these gaps are closed continuously or discontinuously upon the occurrence of the compressive force, compressing the regions of the elastomer intermediate layer that are connected with the adjacent surfaces.

Various possibilities exist for the formation of the Z profiles from the material of the elastomer intermediate layer. Conceivable is, for example, a lens-shaped profile. However, a Z profile is preferred because it can be manufactured particularly easily and is particularly easy to unmold.

In the simplest embodiment, only the carrier plate and a single elastomer intermediate layer are provided with which the clutch lining is connected. Insofar, however, it is preferred for the carrier plate to be connected on both sides with the profiled members of the material of the elastomer intermediate layer as taught in the cited European patent so that the clutch disc is covered with lining on both sides as this is known per se and customary.

In this arrangement it is preferred to have a symmetrical arrangement, with the carrier plate as the plane of symmetry, although other configurations are also possible in which no symmetry exists. For example, the profiled members may be offset at an angle on one side of the carrier plate relative to those on the other side of the carrier plate.

In operation, such clutch discs are subjected to relatively high centrifugal forces. It is therefore preferred for the profiled members of the material of the elastomer intermediate layer to extend radially with respect to the clutch disc. These measures enable the centrifugal forces to be absorbed in the best possible way. However, other arrangements are also possible in this respect, for example, a net-like structure of the profiled members of the elastomer intermediate layer or also a tangential arrangement of these profiled members.

Particularly for reasons of being able to calculate the desired spring characteristic, it is also preferred for the connecting lines to the additional surface regions of the profiled members of the material of the intermediate layer to extend in the radial direction of the clutch disc, that is, the surface regions of the profiled members not connected with the adjacent surfaces extend correspondingly.

According to a further feature of the invention, the Z-shaped members, each having two parts coupled by a connecting portion, are arranged on the metal carrier sheet in a circular array with a spacing between adjoining members. Each member together with flanking partial spacings constitutes a segment on the metal sheet carrier. A ratio of a:b:c is 9:5:1; wherein a is an angle of the segment, b is an angle of the member, and c is an angle of the connecting portion. Each angle has an apex lying in an axis of the clutch disc and two sides flanking the segment, the member and the connecting portion, respectively. Advantageously, 40 segments are provided. These values for the profiled members have been found to be well suited on the basis of calculations. After the calculations, clutch discs having these features were manufactured and have been found to be excellently suited in operation. These tests were based on a conventional clutch disc having a diameter of 228 mm.

It should be mentioned that, according to the invention, a compromise had to be found between two actually contradictory requirements, namely, on the one hand, to make available the largest possible connecting surface between the elastomer material and the adjacent layers so that the connection of this multi-layer component becomes able to withstand high stresses. On the other hand, there should exist, however, unconnected regions as well so that the desired spring characteristic is realized and, as a further degree of freedom, there are the additional surface regions of the profiled members that are not connected with the adjacent layers.

The above-noted ratio values were based on an elastomer material having a Shore hardness of 50 and a modules of transverse elasticity of 0.7 N/mm$^2$, with a maximum spring force for the clutch disc of 6,700N and a spring path of 0.7 to 1.0 mm.

BRIEF DESCRIPTION OF THE DRAWINGS

The invention will now be described in greater detail with reference to an embodiment thereof which reveals further important features as illustrated in the drawing Figures, in which:

FIGS. 1-9 represent the prior art; they are the FIGS. appearing in EP 0,351,447 and are briefly described in the translation supplied in the "Background" section;

FIG. 14 shows the spring characteristic of this clutch disc, with the spring force measured in Newton being plotted over the spring path measured in millimeters for a clutch disc intended for a particular user for a calculated clutch disc according to the invention and for a measured clutch disc according to the invention.

DETAILED DESCRIPTION OF THE PREFERRED EMBODIMENT

Figure 10:
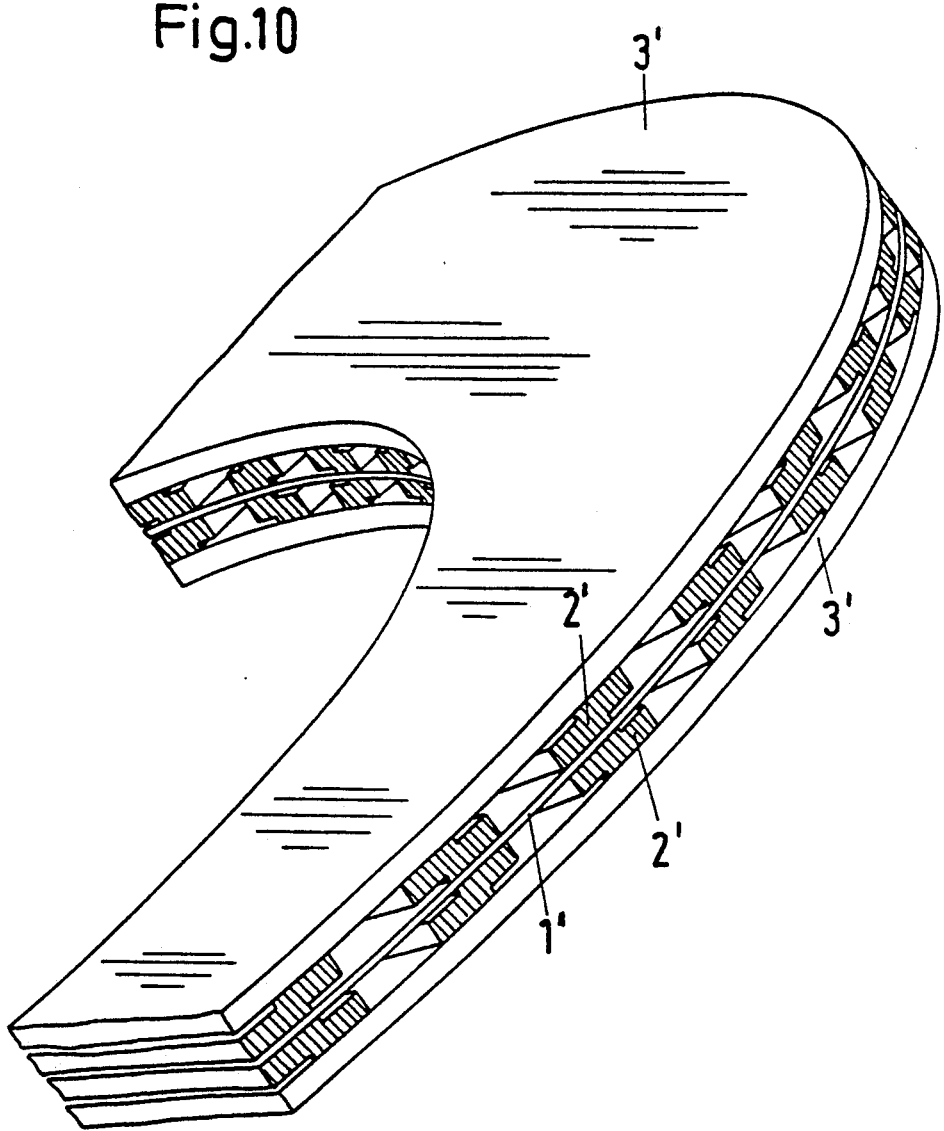
FIG. 10 is a perspective view of a section of a clutch disc according to the invention.

Initially, the basic structure of the clutch disc according to the invention will be described with reference to FIG. 10. This clutch disc is composed of a carrier plate 1' with which profiled members 2' made of a suitable elastomer material are connected on both sides by way of chemisorption as this is taught in the European patent EP 0,351,447, reproduced in, and thus forming part of, this specification.

Clutch linings 3' are again connected with profiled members 2', again as disclosed in the cited European patent.

Figure 11:
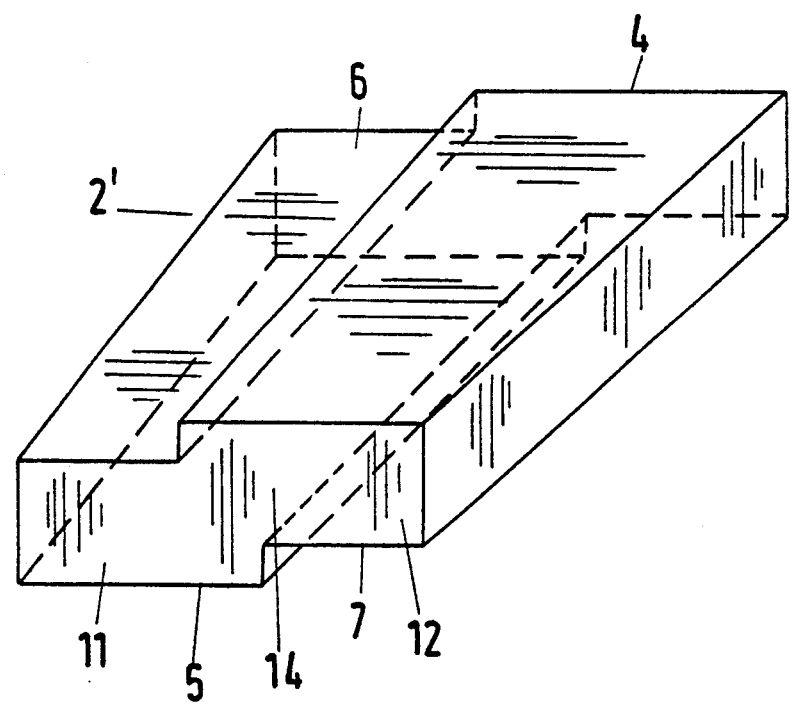
FIG. 11 is an enlarged, likewise perspective view of a segment of the elastomer material employed for this purpose.

FIG. 11 shows, as an enlarged detail, the Z-shaped profile of profiled members 2'. They each have an upper face 4 and a bottom face 5 and these faces are connected with the adjacent layers 1' and 3' by way of chemical sorption.

By way of a step, faces 4 and 5 are followed by further faces 6 and 7 so that, in the unstressed state of the clutch disc, gaps are formed as a result of these steps between the set-back faces 6 and 7 and the faces of layers 1' and 3' that lie opposite them.

If a compressive force acts on the clutch disc in a direction perpendicular to its surface, the space between clutch linings 3' is reduced and the mentioned gaps disappear so that now the additional surface portions 6 and 7 lay themselves against the adjacent layers 1' and 3'. Thus, the desired defined, non-linear spring characteristic is realized for which FIG. 14 gives an example.

FIG. 14 shows a predetermined spring characteristic 8 and also a further curve 9 corresponding to the clutch disc calculated and configured according to the present invention as well as finally a curve 10 measured on a clutch disc according to the invention. It can be seen that for all three curves, the characteristic rises to a greater degree beginning with a spring path of 0.5 or 0.6 mm. This is the result of the fact that, beginning with this spring path, the additional faces 6 and 7 and the partial profiled members 11 and 12 disposed behind them become effective for the spring characteristic.

Figure 12:
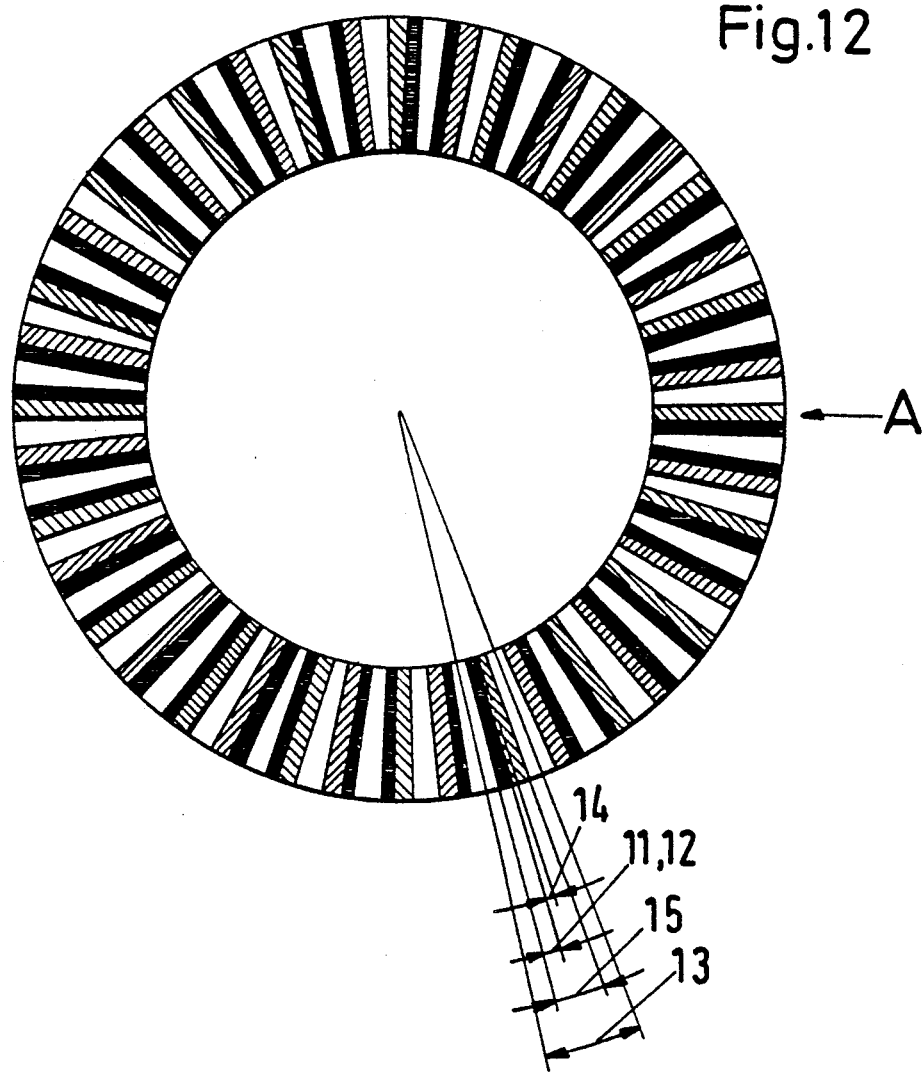
FIG. 12 is a top view of the clutch disc to explain the configuration of the various segments of this disc.
Figure 13:
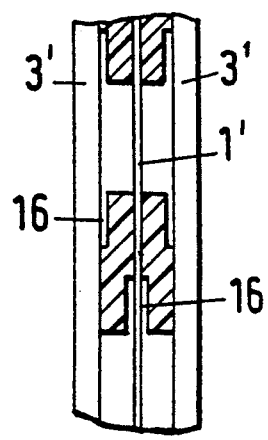
FIG. 13 is an enlarged front view seen in the direction of the arrow A in FIG. 12.

FIGS. 12 and 13 depict further details of the clutch disc according to the invention. FIG. 12 shows that a total of forty segments 13 are provided which in each case extend over an angle of 9°. The central region 14 of solid rubber (see also FIG. 11) extends over an angle of 1°.

On the side next to central region 14, partial profiled members 11 and 12 extend, each over an angle of 2°, so that the entire angle range 15 of profiled members 2' takes up 5°.

Figure 5:
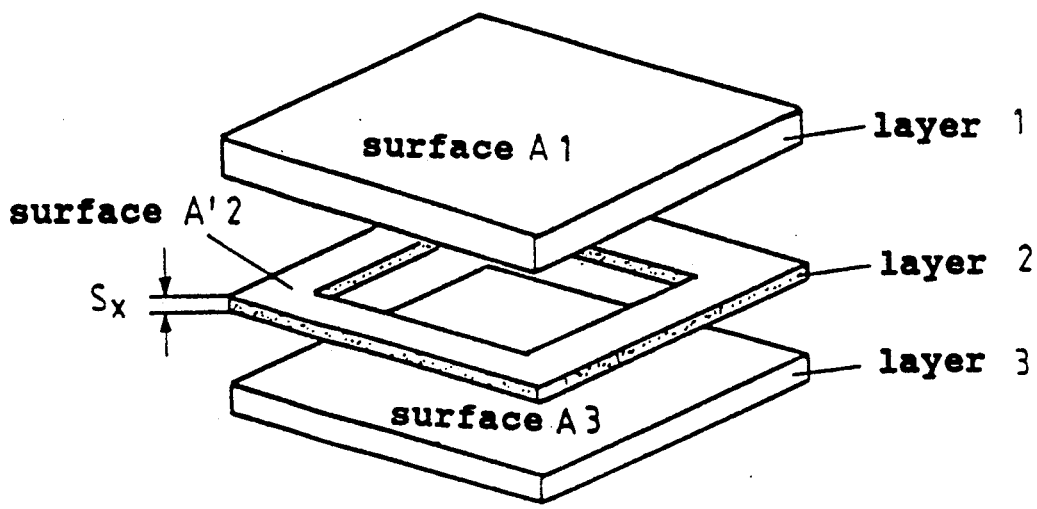
Figures 6, 7:
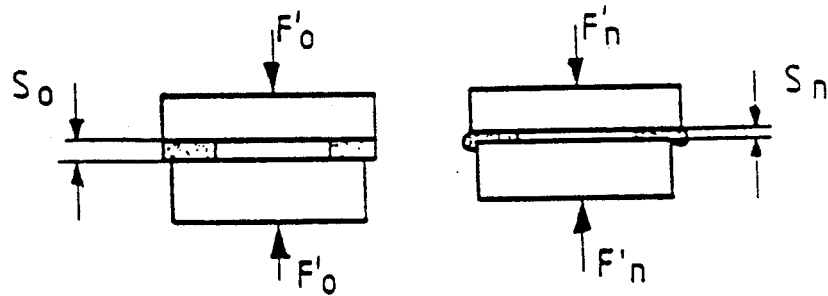
Figure 8:
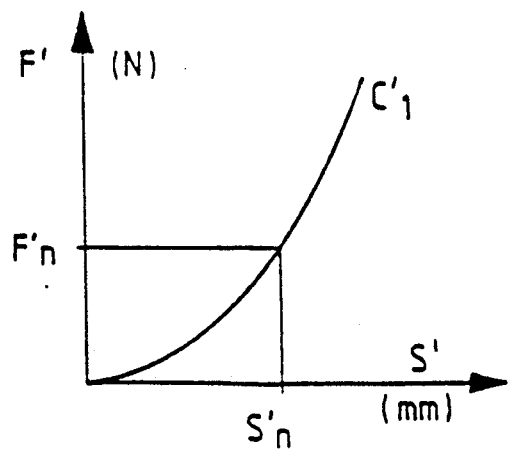
Figure 9:
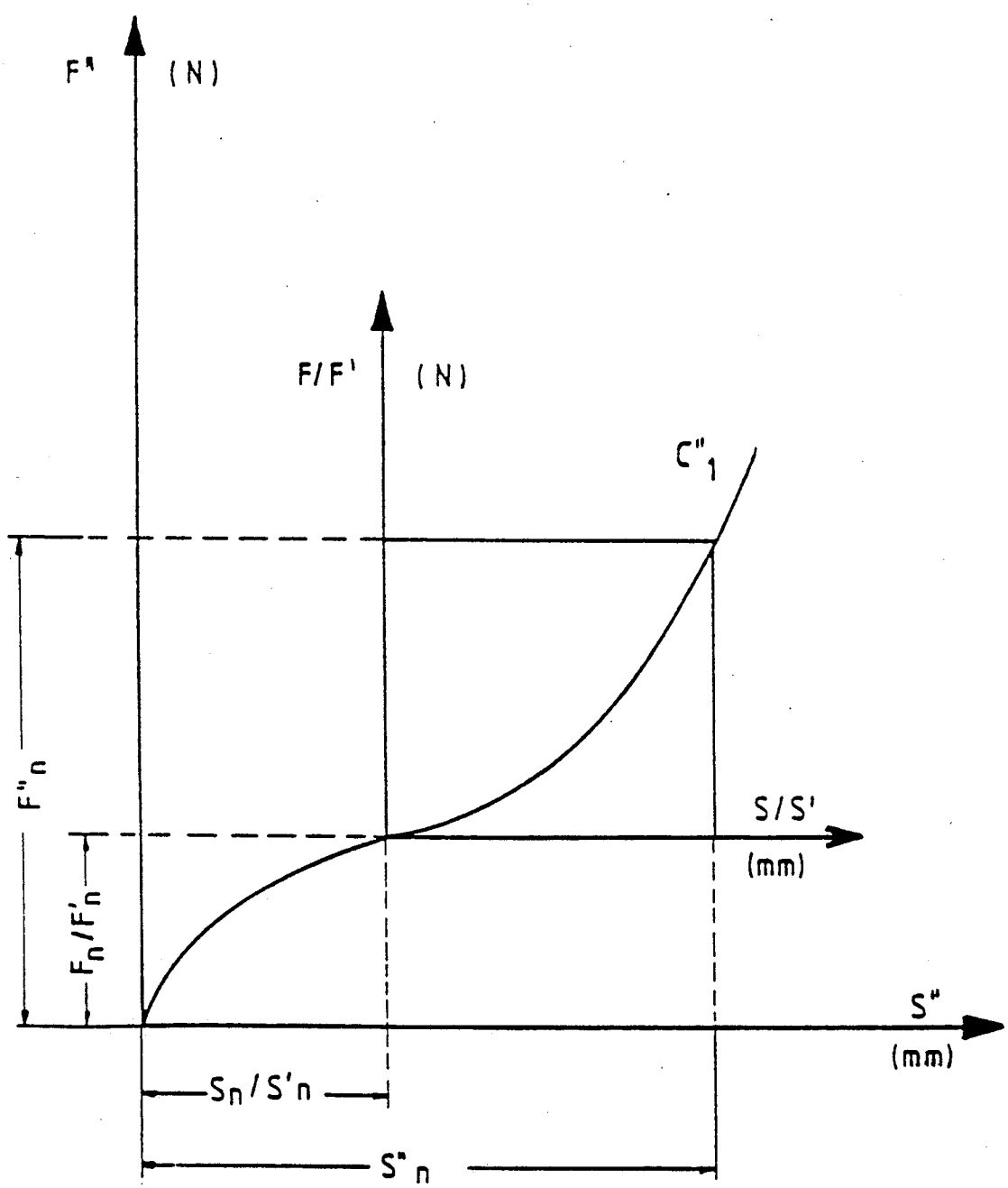

FIG. 13 indicates that the height of gaps 16 is about 0.5 mm (see in this connection also the diagram of FIG. 5) and the total height of profiled members 2' is 2.3 mm.

The inner diameter of the circular ring shown in FIG. 12 is 150 mm and its outer diameter is 228 mm.

For reasons of durability and stressability it would actually be desirable to realize a large connecting surface between the elastomer material and the layers, 1', 3', and 3' adjacent thereto. However, in order to attain the desired non-linearity of the spring characteristic (force-path diagram according to FIG. 14), it is necessary to have free surfaces 6 and 7 which become supporting surfaces only after a certain force has been exerted. The illustrated example here shows that a surface ratio of 1.25 (5° for the overall angle range 15 of the profiled member, divided by 4° for the two gaps 16) brings good results. This surface ratio of 1.25 is thus a good measure which should be adhered to approximately in these configurations.

The non-linear behavior of force and path is realized according to the invention in that the Z deformation of the elastomer segment (profiled member 2') closes the gap beginning in the center and progressing toward the edges with increasing contact pressure while simultaneously increasing the counter-force as shown very clearly in FIG. 14.

Practical examinations of test vehicles under extreme stresses have confirmed the durability of the rubber/metal or rubber/friction coating bond as well as problem-free start-up behavior of a clutch that is equipped with the disclosed clutch disc.

It will be understood that the above description of the present invention is susceptible to various modifications, changes and adaptations, and the same are intended to be comprehended within the meaning and range of equivalents of the appended claims.

What is claimed is:

1. In a clutch disc for a motor vehicle clutch; the clutch disc having a clutch disc plane and including a metal carrier sheet; an elastomer intermediate layer facing the metal carrier layer; a clutch lining facing the elastomer intermediate layer; and a composite binder bonding first surface regions of the elastomer intermediate layer to the metal carrier sheet and to the clutch lining by chemical sorption; areas of the first surface regions being less than areas of the metal carrier sheet and the clutch lining facing the elastomer intermediate layer; the elastomer intermediate layer being essentially composed of a material selected from the group consisting of hydrated nitrile rubber and a fluoroelastomer; the elastomer intermediate layer having an elasticity of non-linear spring characteristics and being effective in a direction perpendicular to the clutch disc plane; the improvement wherein said elastomer intermediate layer has unbonded, second surface regions facing said metal carrier sheet and said clutch lining; said elastomer intermediate layer being of such a configuration that in an absence of a compressive force applied to the clutch disc in a direction perpendicular to said clutch disc plane, said second surface regions are in their entirety spaced from said metal carrier sheet and upon applying a compressive force to the clutch disc in a direction perpendicular to said clutch disc plane, at least parts of said second surface regions assume a contacting relationship with at least one of said metal carrier sheet and said clutch lining.

2. The clutch disc as defined in claim 1, wherein said elastomer intermediate layer is formed of a plurality of spaced members; each member having one part of said first and second surface regions of said elastomer intermediate layer.

3. The clutch disc as defined in claim 2, wherein said members have a Z-shaped cross section.

4. The clutch disc as defined in claim 3, wherein an area ratio of said first surface regions to said second surface regions is approximately 5:4.

5. The clutch disc as defined in claim 1, wherein said metal carrier sheet has opposite first and second sides; said elastomer intermediate layer and said clutch lining being situated on said first side; further comprising an additional elastomer intermediate layer, an additional clutch lining and an additional composite binder situated on said second side of said metal carrier sheet in an arrangement identical to said elastomer intermediate layer, said clutch lining and said composite binder.

6. The clutch disc as defined in claim 5, wherein said metal carrier sheet lies in a plane constituting a symmetry plane of said clutch disc.

7. The clutch disc as defined in claim 2, wherein said members have a length dimension extending in a radial direction relative to said clutch disc.

8. The clutch disc as defined in claim 7, wherein said first and second surface regions of each said member have a length dimension extending in said radial direction.

9. The clutch disc as defined in claim 8, wherein each member has a generally Z-shaped cross section and has two parts coupled by a connecting portion; said members being arranged on said metal carrier sheet in a circular array with a spacing between adjoining members; each said member together with flanking partial spacings constituting a segment on said metal sheet carrier; further wherein a ratio of a:b:c is 9:5:1; wherein a is an angle of the segment, b is an angle of the member, and a is an angle of said connecting portion; each said angle has an apex lying in an axis of said clutch disc and two sides flanking the segment, the member and the connecting portion, respectively.

10. The clutch disc as defined in claim 9, wherein said adjoining circular segments are 40 in number.

* * * * *